April 17, 1951 S. P. DI ROSA 2,548,957
VALVED COUPLING
Filed July 5, 1947
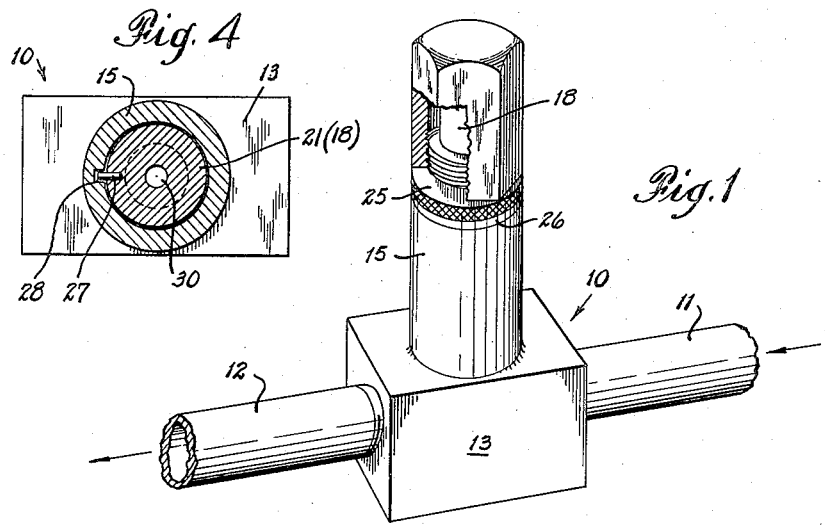
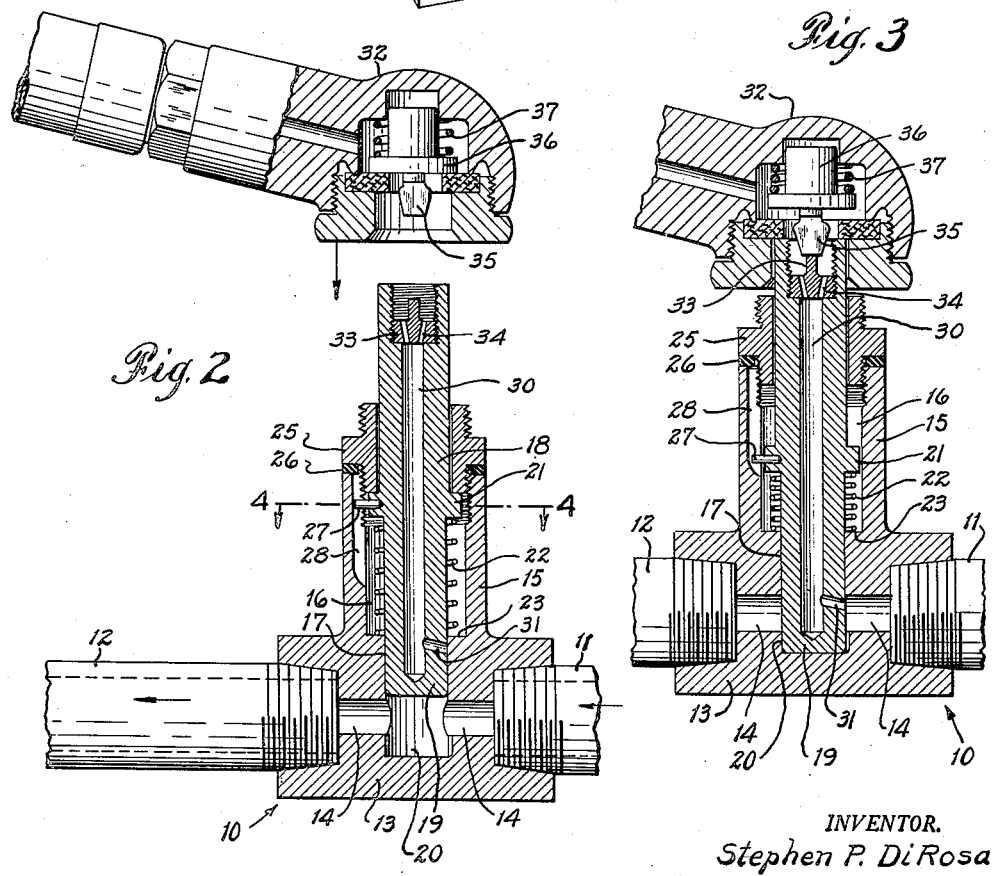
INVENTOR.
Stephen P. Di Rosa
BY
Morgan, Finnegan & Durham
ATTORNEYS.

Patented Apr. 17, 1951

2,548,957

UNITED STATES PATENT OFFICE 2,548,957

VALVED COUPLING

Stephen P. Di Rosa, New York, N. Y.

Application July 5, 1947, Serial No. 759,189

1 Claim. (Cl. 284—17)

The present invention relates to a valve particularly adapted for use in the fuel line of an internal combustion motor to permit the application of air pressure to clean the line. It will be apparent, however, that the invention is useful for a large number of related and other purposes.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations, and improvements herein shown and described.

The accompanying drawings, referred to herein and constituting a part hereof, illustrate an embodiment of the invention, and together with the description, serve to explain the principles of the invention.

Of the drawings:

Fig. 1 is a perspective view of a typical and illustrative embodiment of the present invention;

Fig. 2 is a cross-sectional view of the valve shown in Fig. 1 with the cap shown removed, and showing a conventional air hose head valve in a position to be applied thereto;

Fig. 3 is a cross-sectional view of the valve of the invention corresponding to Fig. 2, showing the conventional air hose head valve in operative connection therewith.

The present invention has for an object the provision of a simple, safe and efficient valve which is adapted to permit the application of air or other pressure to a pipe line in order to clean it out. Another object is the provision of a valve of the type mentioned which permits the application of a cleaning out pressure in one direction in the pipe line only, sealing the line in the other direction to prevent pressure thereon. The invention provides a valve which may be efficiently used with the air hose equipment of conventional type found in automobile service stations and garages, whereby an engine fuel or other line may be quickly and conveniently cleaned of obstructions without dismantling parts of the mechanism.

Referring now in detail to the illustrative embodiment of the invention shown by way of example in the accompanying drawings, the valve is indicated generally by the numeral 10 and is shown as mounted in the fuel line of an automobile, for instance, having the portion 11 leading from the gasoline tank or other fuel reservoir to the valve, and the portion 12 continuing from the valve toward the fuel pump, carburetor and intake manifold, the direction of fuel flow being as indicated by the arrows in Fig. 1. When desiring to clean out such a line or to clear the intake thereof from obstructions at the fuel reservoir it is the most efficient procedure to merely apply a substantial air pressure thereto in the direction of said reservoir. However, it is ordinarily necessary to dismantle the fuel line in order to apply such pressure, and, furthermore, some arrangement must be used to utilize a ready source of air pressure, such as that found in service stations and garages. The valve 10 may be permanently inserted in a fuel line to fulfill these purposes, and further serves to protect the diaphragm of the fuel pump from damage, the valve permitting air pressure only in the direction of the tank.

As shown in Figs. 2 and 3 of the drawings, the valve 10 comprises a T-shaped body or casing with a base portion 13 in which the fuel line portions 11 and 12 are threadedly engaged and a bore 14 establishing communication between the lines. The valve body further comprises an integral riser portion 15 having hollow bore 16 which is extended downwardly into a bore 17 of base portion 13 substantially at right angles to the bore 14.

A plunger 18 is provided for longitudinal motion within bore 16 of riser portion 15, and the lower end or head 19 of the plunger is preferably closely fitted to bore 17. As shown, bore 17 extends to below the base portion bore 14, providing a cylindrical seat 20 for the plunger end 19 when the latter is in depressed position.

The plunger 18 is provided with an integral shoulder 21 centrally of its length and a coiled spring 22 seats on this shoulder and upon an internal shoulder 23 between the casing bores 16 and 17. The plunger is thus upwardly biased by spring 22, and its longitudinal movement is limited by a shouldered annular cap 25 which is threaded to engage internal threads at the top of riser portion 15. A washer 26 is inserted between the shouldered annular cap and the riser portion to seal the valve from air loss. A pin 27 is provided to extend radially outwardly from shoulder 21 of the plunger 18, and said pin is adapted to travel in a longitudinal groove 28 in the surrounding wall of riser bore 16, serving as a guide to prevent plunger 18 from rotating with respect to the valve casing.

The plunger 18 is adapted to transmit air under pressure in a single direction only in line 12—11 and, in the case of an automobile fuel line, preferably into fuel line portion 11. As embodied, plunger 18 is provided with a central bore 30 and with a radially directed passage 31 in the plunger end 19, which is adapted to communicate with the portion of bore 14 leading to line portion 11 when the plunger is depressed, as shown in Fig. 3.

The valve of the present invention is adapted to be utilized with a conventional air hose head valve, illustratively shown in Figs. 2 and 3 and numbered 32. The end of bore 30 at the top of plunger 18 is therefore enlarged and internally threaded to receive the valve release member 33 which has apertures 34 establishing air communication between bore 30 and the outer end of the plunger. It will thus be apparent that when air hose valve 32 is pressed over the top of plunger 18, the valve release member 33 will contact the air hose valve release member 35, raising plunger 36 against the pressure of air and also coiled spring 37, and releasing air pressure to the valve of the invention and the fuel line portion 11.

The relationship of the present blow-out valve and the air hose valve head in cooperating and open relationship is shown in Fig. 3 of the drawings. The coiled spring 22 of the blowout valve is preferably made weak enough so that it will permit the depression of plunger 18 to its position with end 19 seated at 20 before the air hose valve head 32 is opened for release of air pressure, so that the fuel line portion 12 will be sealed off before pressure is admitted to line portion 11. This serves to protect the fuel pump diaphragm from possible damage by the air pressure from head 32. Further precautions to prevent such occurrences are observed by the proportions of the blow-out valve elements, which are such that plunger end 19 has begun entry of seat 20, sealing off line 12, before passage 31 is uncovered to communicate with line portion 11.

It will be apparent that the valve of the present invention provides a safe and efficient mechanism for permitting the cleaning out of fuel or other lines, may be easily installed in existing engines and left as a permanent part of the equipment and may be made a part of new engines. The valve can conveniently be incorporated with the fuel pump of an automobile motor, for instance, and be furnished as a unitary piece of equipment.

The invention in its broader aspects is not limited to the specific mechanisms shown and described but departures may be made therefrom, within the scope of the accompanying claim, without departing from the principles of the invention and without sacrificing its chief advantages.

What I claim is:

A blow out valve for a fuel line for use with an air hose valve having a valve release means to be actuated by pressure opposed to the air pressure on said air hose valve comprising, in combination, a casing having three intersecting bores therein two of which are adapted for passage of fuel through the casing, a hollow plunger closely fitted for movement in the third of said bores and extending outwardly of the casing, said plunger having one position permitting communication between said two bores and a second position closing communication between said two bores, a seat in said casing constituting a prolongation of said third bore to closely receive an end of said plunger in said second position, the interior of said plunger being open to the exterior of the casing at one end of said plunger, and having an aperture adjacent the other end of said plunger for communication with one of said two bores, said aperture being closed within said third bore in said one position of said plunger and open to communication with one of said two bores in the second position of said plunger, said aperture opening to communication with said one of said two bores only when said plunger has entered said seat, means biasing said plunger to to said first position with less pressure than that necessary to actuate an air hose valve release means, and air hose valve release means in the bore of said plunger at the end thereof outwardly of said casing.

STEPHEN P. DI ROSA.

REFERENCES CITED

The following references are of record in the file of this patent:

UNITED STATES PATENTS

| Number | Name | Date |
|---|---|---|
| 250,823 | Lanpher | Dec. 13, 1881 |
| 769,688 | Cederstrom | Sept. 13, 1904 |
| 1,073,719 | Timmer | Sept. 23, 1913 |
| 1,207,392 | Frazier et al. | Dec. 5, 1916 |
| 1,762,823 | Krusell | June 10, 1930 |
| 1,850,111 | Kelsey | Mar. 22, 1932 |
| 1,878,303 | Trathen | Sept. 20, 1932 |
| 2,397,265 | Jacobsson et al. | Mar. 26, 1946 |